Nov. 7, 1933.  D. R. LAUDERBACK  1,934,133
MEANS FOR PREVENTING FROSTING OR CONDENSATION
OF MOISTURE ON GLASS OR OTHER SURFACES
Filed May 4, 1931  6 Sheets-Sheet 1

INVENTOR
David R. Lauderback
BY
ATTORNEY

Nov. 7, 1933.  D. R. LAUDERBACK  1,934,133
MEANS FOR PREVENTING FROSTING OR CONDENSATION
OF MOISTURE ON GLASS OR OTHER SURFACES
Filed May 4, 1931  6 Sheets-Sheet 3
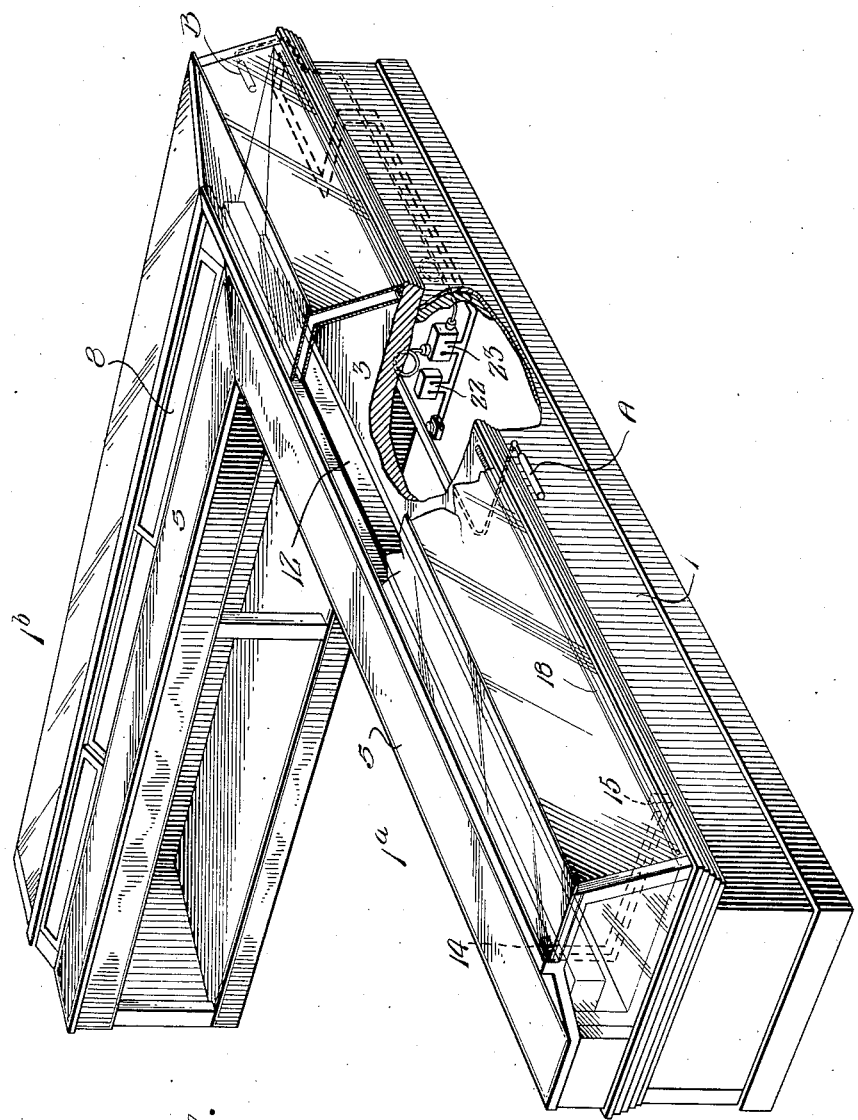

Nov. 7, 1933.   D. R. LAUDERBACK   1,934,133
MEANS FOR PREVENTING FROSTING OR CONDENSATION
OF MOISTURE ON GLASS OR OTHER SURFACES
Filed May 4, 1931   6 Sheets-Sheet 4

INVENTOR
David R. Lauderback
ATTORNEY

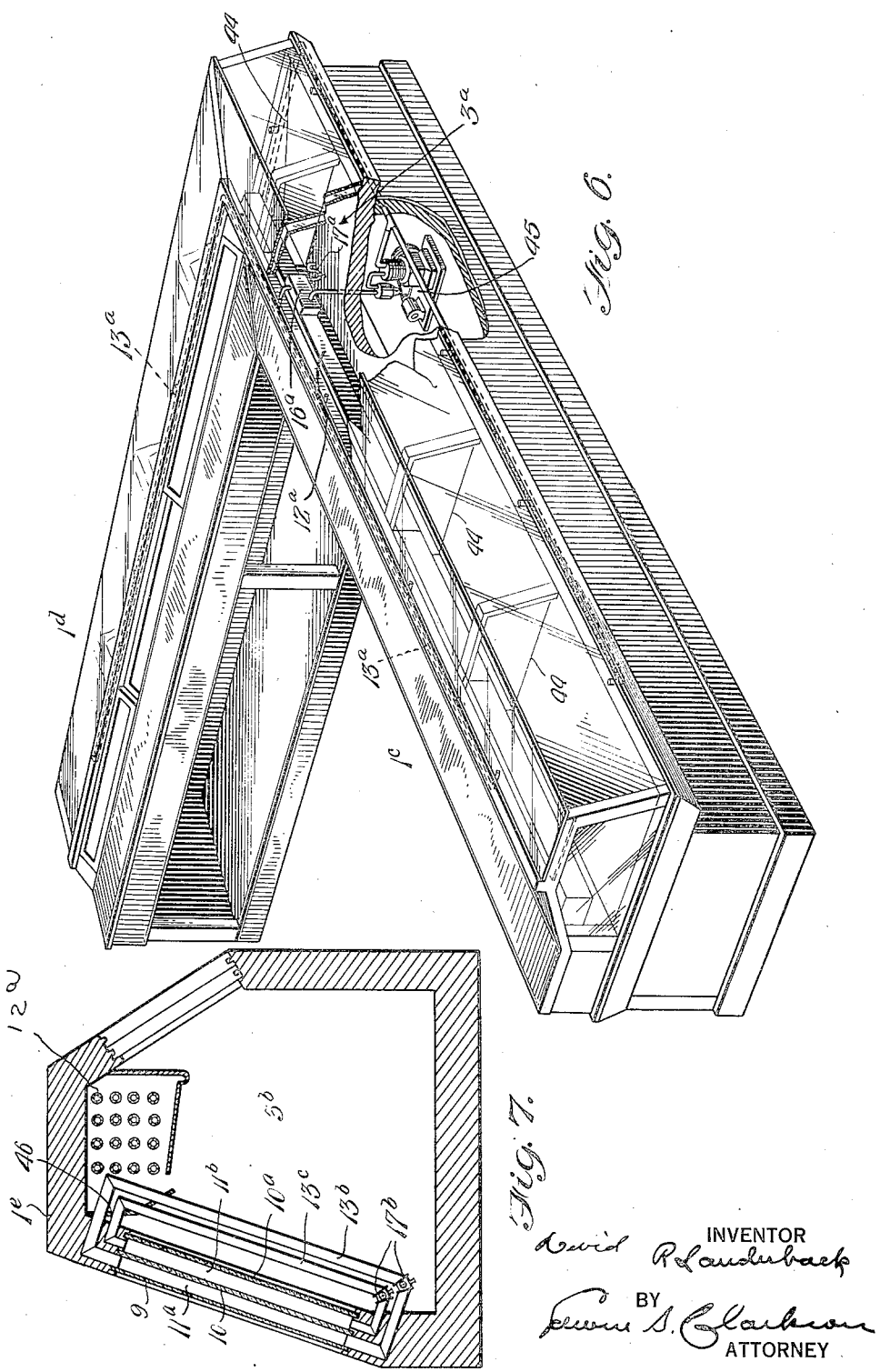

Nov. 7, 1933.                D. R. LAUDERBACK              1,934,133
            MEANS FOR PREVENTING FROSTING OR CONDENSATION
                   OF MOISTURE ON GLASS OR OTHER SURFACES
                         Filed May 4, 1931          6 Sheets-Sheet 6
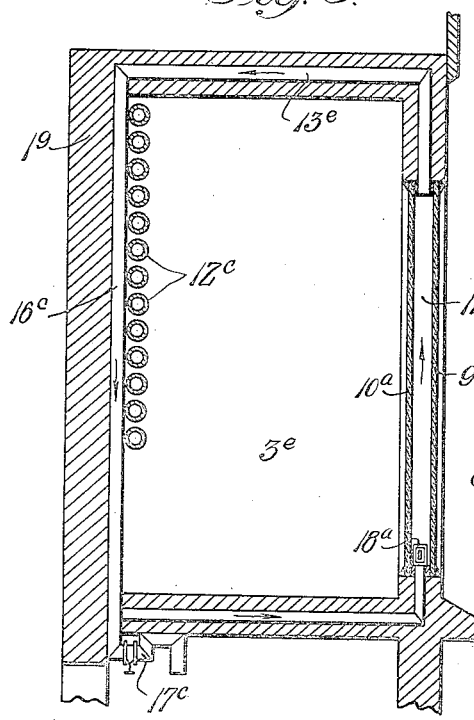
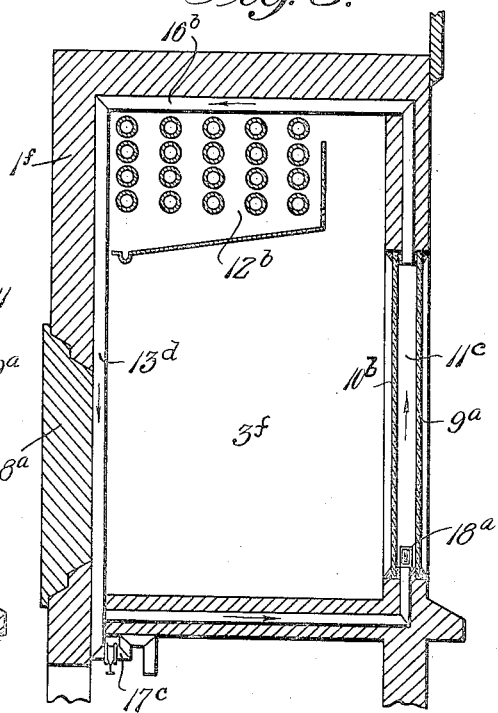
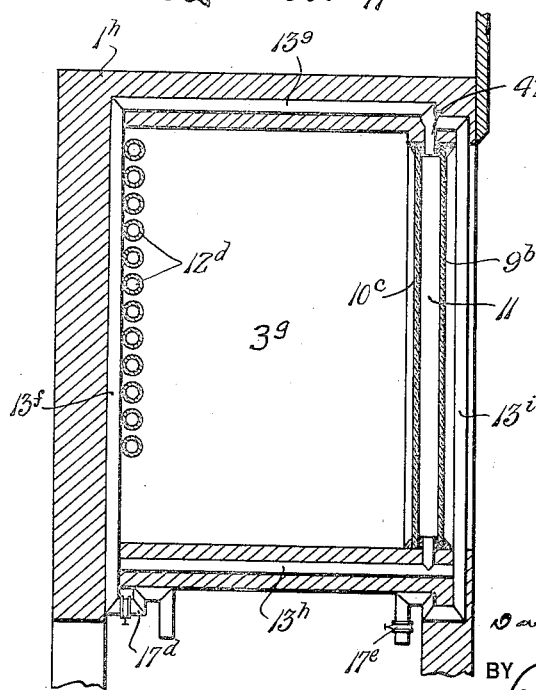
INVENTOR
David R. Lauderback
BY
[signature]
ATTORNEY Patented Nov. 7, 1933

1,934,133

UNITED STATES PATENT OFFICE 1,934,133

MEANS FOR PREVENTING FROSTING OR CONDENSATION OF MOISTURE ON GLASS OR OTHER SURFACES

David R. Lauderback, Jacksonville, Fla.

Application May 4, 1931. Serial No. 534,976

16 Claims. (Cl. 62—89.5)

This invention relates to means for preventing frosting or condensation of moisture on glass or other surfaces, and particularly the glass surfaces of observation or show windows, showcases, especially those of refrigerated type, display boxes, and the like.

The main object of the invention is to provide novel and improved means for automatically maintaining a predetermined relation between the temperatures of air on opposite sides of a surface or surfaces, such as a glass pane or spaced glass panes, whereby the deposit of frost or moisture of condensation on such surface or surfaces will be prevented.

A further object of the invention is to provide simple, reliable and efficient means for maintaining a proper relative condition, as to temperature or humidity or both, of the air within and on opposite sides of a transparent-walled chamber or panel, whereby any temperature or other changes liable to cause frosting of the chamber walls or condensation of moisture thereon will be prevented.

A still further object of the inventiton is to provide means for automatically maintaining a temperature balance between the air on one side of a double-walled transparent chamber and the air in said chamber such as will prevent frosting of or the deposit of moisture on one of the chamber walls disposed at what may be the high temperature side of the chamber, and also to maintain such a condition of the air in the chamber, as to prevent frosting of or the condensation of moisture on an opposite wall of the chamber disposed at what may be termed the low temperature side of the chamber.

A still further object of the invention is to provide means of the character described which may be employed in connection with showcases, show windows of stores, or other receptacles having glass or other transparent show panels or observation windows exposed to different temperatures at opposite sides thereof whereby the surfaces of the panels or windows will be kept free from frost or moisture at all times.

With these and other objects in view, the invention consists of the features of construction, combination and arrangement of parts, hereinafter fully described and claimed, reference being had to the accompanying drawings, in which:

Fig. 3 is a diagrammatic view with parts in section of the main working parts of the apparatus shown in Figs. 1 and 2.

Fig. 4 is a view showing the embodiment of the invention in a showcase of some length and having portions arranged at an angle to each other.

Fig. 6 is a view similar to Fig. 4 showing a modification in which the conditioning of the air is effected by the circulation of dehydrated air.

Fig. 7 is a view similar to Fig. 1 showing another form of the invention embodied in a refrigerator showcase.

Fig. 8 is a view showing the embodiment of the invention in a show window structure.

Fig. 9 is a view showing another embodiment of the invention in a show window structure.

Fig. 10 is a view showing still another embodiment of the invention in a show window structure.

Figure 1:
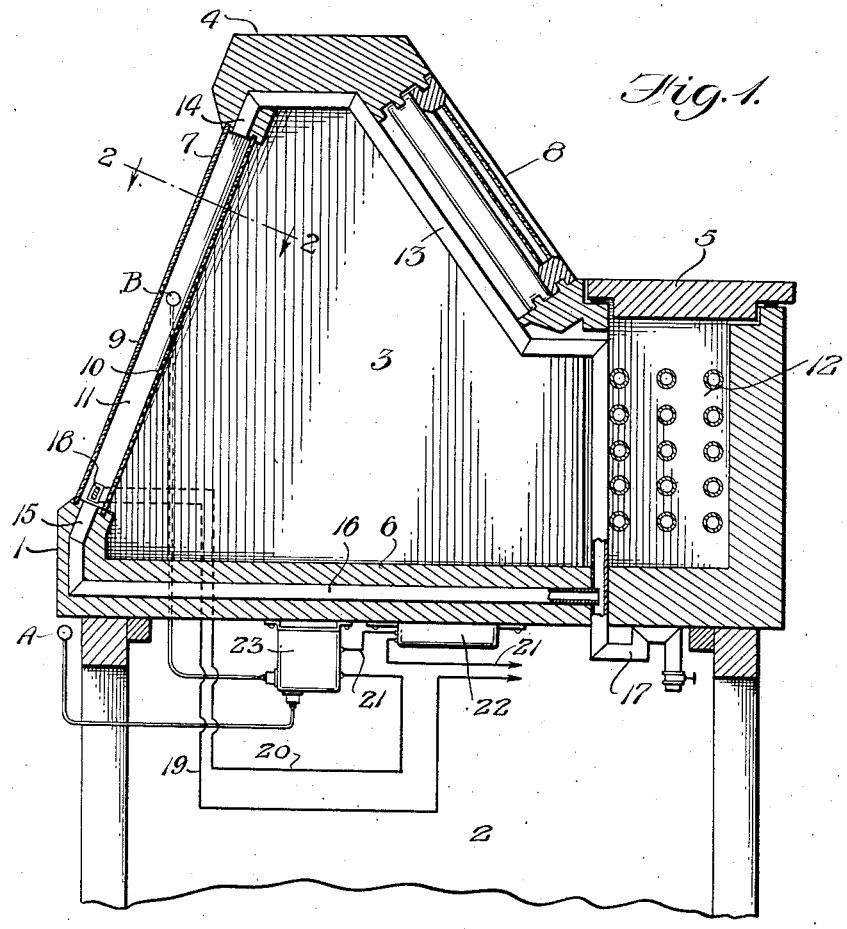
Fig. 1 is a front-to-rear section through a refrigerator showcase, showing the application of one form of my invention thereto.
Figure 2:
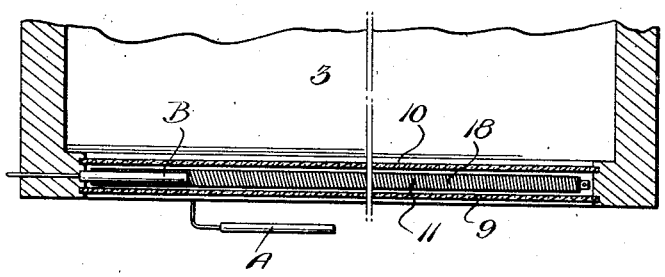
Fig. 2 is a horizontal section on line 2—2 of Fig. 1.

In the practical embodiment of my invention disclosed in Figs. 1 to 3, inclusive, showing the application of the invention to a refrigerator showcase, 1 designates the showcase generally having a lower storage compartment 2, an upper storage and display compartment 3, a top display or service shelf or counter portion 4, and a rear work shelf or counter portion 5 arranged at a lower level than the shelf or counter portion 4. In the compartment 3, which is separated from the compartment 2 by a horizontal partition 6, are intended to be placed goods to be kept at a prescribed low temperature and which are visible to the customer and merchant through front and rear transparent observation panels 7 and 8, which are preferably suitably inclined to the vertical and converge upwardly toward the top counter portion or ledge 4. The panel 7 consists of two or more panes of glass disposed in spaced relation to provide one or more insulating or air conditioning chambers between the chamber 3 and the external atmosphere of the room or compartment in which the counter is arranged. In the present instance, the panel 7 is shown as consisting of a pair of transparent panes 9 and 10 suitably spaced to provide an air conditioning chamber or enclosure 11, the walls or panes of which are designed, in accordance with my invention, to be kept clear of frost or water of condensation in order to provide at all times a clear vision panel through which the customer may inspect the goods contained within the compartment 3. The panel 8 may consist of sliding or other movable doors having spaced transparent panes forming dead air spaces therebetween to allow the merchant to observe the interior of the compartment 3 through the closed doors while preventing hot or cold exchange through the panels forming a part of said doors. The rear counter portion 5 may consist of the removable top or top sections of a rearward extension of the compartment 3 therebeneath in which is arranged a cooling coil 12 forming part of any type of refrigerating system employing anhydrous ammonia or any other suitable refrigerant. It will be understood, of course, that this type and construction of showcase is illustrated merely for purpose of example, as the invention may be applied to showcases or windows of any approved type or any of the types in common use.

My invention consists in the provision of means for automatically regulating and maintaining such a condition of the air in the compartment 11, relative to the external air to which the pane 9 is exposed and the air in the compartment 3 to which the pane 10 is exposed, as to prevent any deposit of frost or moisture upon the pane 9 due to the differences in temperature of the air to which its opposite surfaces are exposed or any frosting or the deposit of moisture on the pane 10 which might occur in the event of the air within the chamber 11 containing an undue amount of moisture. My invention is accordingly designed to provide means for heating or dehydrating or both heating and dehydrating the air contained within and supplied to the chamber 11 so as to maintain such air at a temperature at or near the temperature of the outside air and sufficiently free from moisture to prevent deposits on the pane 10 due to differences in temperature between such air in the chamber 11 and the air in the compartment 3.

In carrying my invention into practice, I provide a circulating and dehydrating system for dehydrating air and circulating the same through the chamber 11. This system comprises a pipe or conduit 13, preferably arranged at or near either or each end of the compartment 3, and having an upper inlet end 14 communicating with the top of the chamber 11 and an outlet or discharge end 15 communicating with the bottom of the chamber 11, whereby an induced gravity flow of air, due to temperature variations, and which may be varied by the heating means hereinafter described, is obtained in which the air entering the conduit 13 at the top of the chamber 11 flows through the portion of the conduit in the compartment 3, during which it is conditioned, and then flows into the bottom of the chamber 11 for upward travel therein. As shown, a portion 16 of the conduit passes in contact with or in close proximity to the coil 12, so as to be cooled thereby, whereby such portion 16 of the conduit is caused to act as a dehydrator to chill the air passing therethrough, whereby any excess moisture contained therein is condensed and deposited in the pipe portion 16 and discharged by gravity therefrom through a check valved drain outlet 17, the air in dehydrated condition thence flowing through the end 15 of the conduit into chamber 11. The part 16 of the conduit is so proportioned and arranged with respect to the coil 12 that a determined rate of circulation of the air is obtained and the circulated air, under all normal working conditions, maintained at a determined degree of dryness or dehydration.

For the purpose of heating the air in the chamber 11, and thereby temperature conditioning such air with respect to the external air, and additionally regulating its degree of dehydration, I provide within the bottom of the chamber an electrical heating coil or unit 18 of suitable type which is arranged in the path of the air entering through the inlet end 15 of the conduit, whereby such entering air will be immediately heated. This heater is arranged in an electric circuit including conductors 19, 20 and 21 supplied with current in practice from any electric service system or main source of supply. In this circuit are also arranged a hygrostat 22, or automatic switch governed by the humidity of the external air, for making and breaking the electric circuit, and an automatic thermostatically controlled regulator or switch device 23 for controlling the supply of current to the heater 18.

The switch device 23 is shown particularly in Fig. 3 and comprises a casing 24 with which are associated a pair of diaphragms or fluid pressure motors 25 and 26 having connected therewith pipes or tubes 27 and 28 connected with thermal elements 29 and 30, respectively. Each motor 25 or 26 may consist of a casing containing a sylphon bellows or its equivalent forming in connection with the pipe and thermal element contained therein a hermetically sealed system filled with air or other acceptable fluid expanded or contracted by variations of temperature of the element 29 or 30 to effect the expansion or contraction of the sylphon bellows. The motors 25 and 26 have their movable members or bellows provided with bearing contacts 31 and 32 which exert pressures in opposition to each other on the right angularly disposed arms of a bell-crank or L-shaped control member or lever 33, for moving said lever in opposite directions. Against one of the lever arms, namely, that engaged by the bearing 31 of motor 25, bears the contact member 34 actuated by the pressure spring 35 of a differential adjuster or resistance device adjustable to vary its resistance to the movement of the switch 33 by the motor 25 without varying the resistance of the switch to its movement by the motor 26, so that the ranges of movement of the lever under the action of the motor 25 may be varied to adapt the motors 25 and 26 to act at different relative temperatures, or, in other words, to set the lever in other words, to set the lever 33 to operate for a circuit closing action at any certain degree of temperature influencing the thermal element 29 and to operate for a circuit breaking action at any certain relative degree of temperature influencing the thermal element 30. In the present instance a threaded adjusting disk 36 is shown as provided for varying the resistance of the spring 35. A link 37 connects the lever 33 with a pivoted armature or switch lever 38 which is connected to one of the circuit terminals and the free end of the armature is provided with a contact 39 for engagement with or disengagement from another circuit contact 40 to make or break the circuit. Preferably the armature is also provided with a contact 41 for coaction with a contact 42 on a permanent magnet 43 whereby a quick and positive closing of the armature switch may be effected on the switch nearing a closing position. The thermal element 29, as shown, is placed at a suitable point so as to be exposed to and influenced by the external atmospheric air, or atmospheric air of the room in which the counter is arranged, while the thermal element 30 is disposed within the chamber 11 of the transparent panel 7 so as to be influenced by the temperature of the air therein, the lever 33 being thus always exposed to the opposing pressures of the motors 25 and 26 created by the differences or variations between the external temperature and the temperature in chamber 11. In practice the parts of the switch mechanism are so adjusted that the pressure differences approximately balance so that a slight difference of temperature as between that of the outside air and that contained in the chamber 11 will be sufficient to effect a circuit making or circuit breaking operation of the armature switch 38. Thus, assuming that the temperature of the external air is assumed, for operative purposes, to be 70° F., the temperature of the air in chamber 11 should be kept at that degree or approximately that degree, that is, a few degrees above or below the same, so that a balancing action of the thermostatic control devices working on the lever will be established whereby the temperature of the air within the chamber 11 will always be maintained at or close to the temperature of the outside air, whereby frosting of the pane 9 or deposits of moisture thereon due to wide variations of temperatures on its opposite sides will be prevented.

In the operation of the apparatus, it will be understood that through the operation of the refrigerating system including the coil 12 the temperature within the compartment 3 will be maintained at a determined low degree, which may vary from zero or below up to 35° F. or more. The air in the chamber 11 will thus be exposed at one side to the low temperature of the chamber 3 and at its opposite side to the normally higher external temperature. As long as the external temperature is higher than the temperature of compartment 3 the thermostatic control system is governed by the variations of temperature on the thermal elements 29 and 30 to hold the switch 38 closed so that current will be supplied to the heating unit to heat the air in the chamber 11 so as to maintain such air at a temperature approximately equal to the outside temperature. As soon as this condition exists the pane 9 will be kept free from moisture. In the operation of the apparatus the air in the chamber 11 and circulatory system including the pipe 13 is kept in motion and said air maintained in a dehydrated state or free from excess moisture by the action of the dehydrator 16, so that, notwithstanding the temperature differences between the air in compartment 3 and chamber 11, the surface of the inner pane 10 will be kept free from frost or moisture deposits. In the event, however, that the external temperature should sufficiently approach that of the air in the compartment 3, the thermostatic control devices will open the switch and cut off the supply of current to the heater 18 so that the air in the chamber 11 will not be heated to a temperature above that of the external air. Under these conditions there will be a relatively slow travel of the air through the circulatory system and the dehydrator alone will act so that air in a properly dehydrated state will be supplied to the chamber 11. Thus it will be seen that under all conditions of temperature of the external air relative to that of the refrigerating compartment 3, a condition of the air in chamber 11 relative to the external air and the air in compartment 3 will be maintained such as to prevent frosting or deposit of moisture upon the outer pane due to excess temperature variations between the outside air and air in chamber 11 or the frosting or deposit of moisture on the pane 10 due to the actions which would occur if the air were not properly dehydrated owing to the unavoidable differences in temperature between the compartment 3 and chamber 11. It will be evident, therefore, that the panel 7 will always be kept in a clear vision state by means of a very simple, effective and reliable character, which may be installed and operated at comparatively low installation and maintenance costs.

Figure 5:
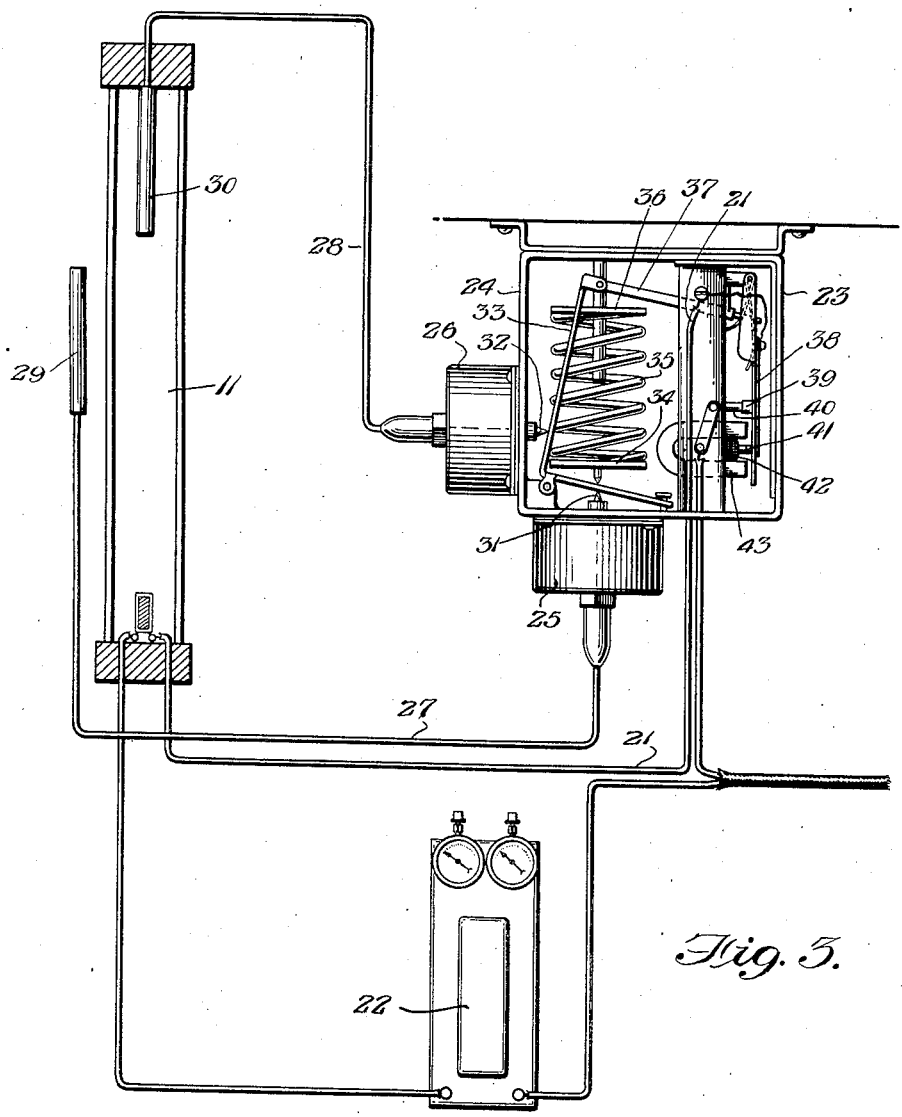
Fig. 5 is a front perspective view of one section of a showcase such as shown in Fig. 4 with parts at one end thereof broken away or in section to better disclose the elements of the invention therein.
Figure 5:
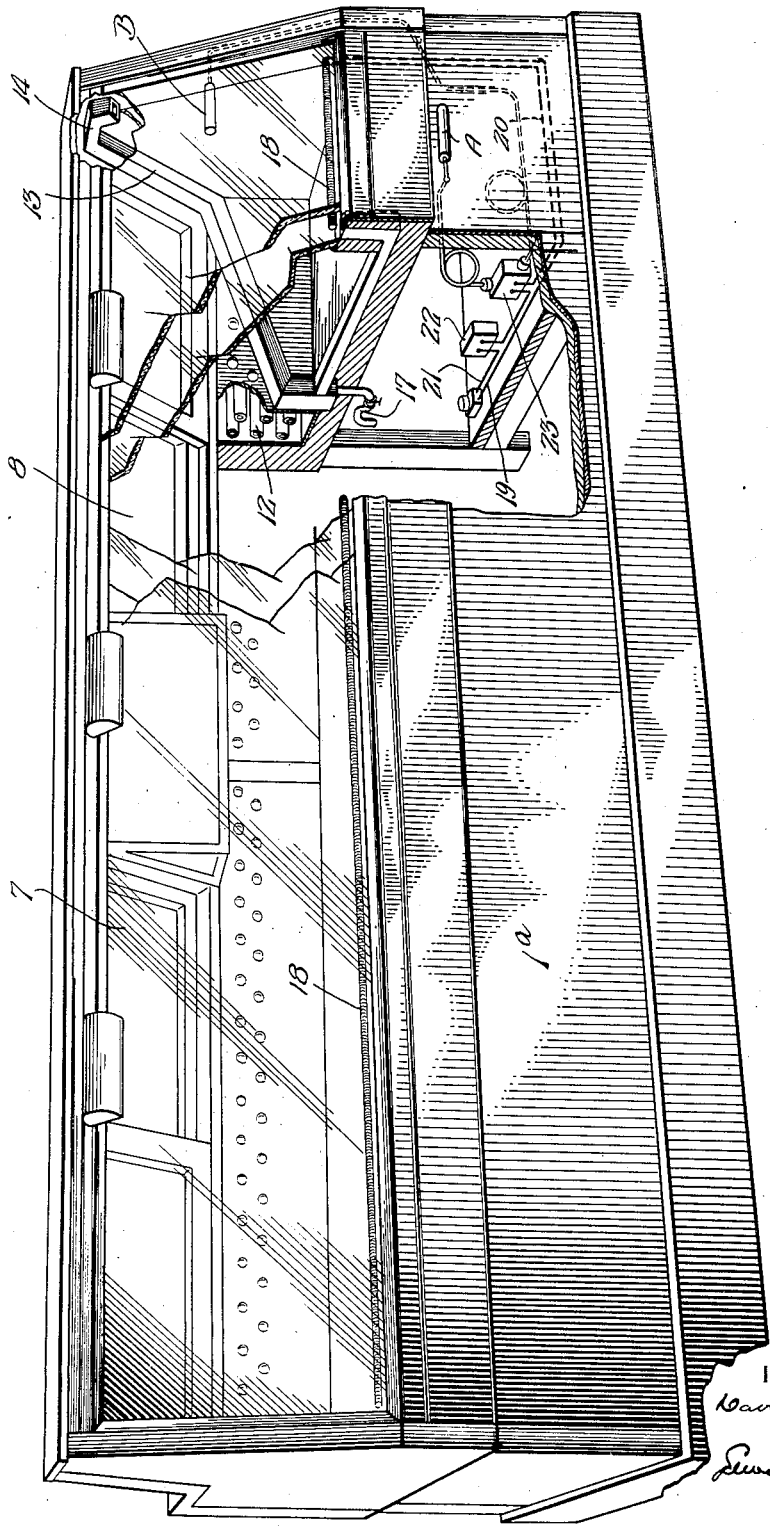

In Figs. 4 and 5 I have shown the application of the invention to two long counter sections 1$^a$ and 1$^b$ arranged at an angle, such as a right angle, to each other. Where the counter section is not too long, the air circulating and conditioning devices may be arranged, as shown in Fig. 5, at one end only of the counter section. If the counter is of considerable length, however, or composed of long counter sections arranged at an angle to each other, as in Fig. 4, the air circulating and conditioning arrangement shown in Fig. 5 may be duplicated, so far as the air circulating means is concerned, or the entire apparatus is concerned, at each end of a long counter, or at the remote ends or such ends and the point of intersection of angularly arranged counter sections, according to climatic and other controlling conditions. In the case of the use of a long counter or the arrangement of counter sections as shown in Fig. 4, the counter or each counter section may be, if desired, divided by internal front-to-rear partitions into a series of storage compartments and the air circulating conduit will communicate, in such event, with each of the compartments.

In Fig. 6 I have shown counter sections 1$^c$ and 1$^d$ arranged at an angle to each other, as in Fig. 4, and wherein the interior of the refrigerating space of each counter section is divided by glass or other suitable partitions 44 into a series of compartments 3$^a$. All of these compartments 3$^a$ are in communication with the air circulating conduit 13$^a$, and in this conduit is arranged a dehydrator 16$^a$ cooled by contact with the refrigerating coil 12$^a$ for separating the excess moisture from the air and discharging the same through a check valved vent 17$^a$. In the circulatory system is arranged a pump or compressor 45 which is preferably electrically driven and operates to circulate the air through the circulatory system. This pump is preferably simultaneously operated with the heating element, by means of a two-pole thermostatic switch, controlling the heating element to keep the temperature in chamber 11 corresponding substantially to that of the outside atmospheric temperature, the switch acting to close the circuit to the pump at the same time it closes the circuit to the heating element, and also opening both circuits simultaneously. By this mode of control the air from the pump is heated and its relative humidity lowered to better condition the air in chamber 11, the humidity of the air being reduced to a sufficient degree to prevent sweating of the outside glass, such as might be caused if the pump should run when the heating element is not in action. Ordinarily the running time of the pump is comparatively short so that its operating expense is very light.

In the embodiment of my invention shown in Fig. 7, I have disclosed a showcase 1e of the same general type as that illustrated in Figs. 1, 2 and 3, but wherein the front transparent display panel consists, in addition to the panes 9 and 10, of a third pane 10a, thus forming front and rear air conditioning chambers 11a and 11b. Pipes or conduits 13b and 13c communicate with these respective chambers and may be employed or not in connection with electrically controlled heating means and a force feed device as previously described. In this arrangement the upper ends of the conduits 13b and 13c are disposed between the upper portion of the transparent front panel and a cooling coil 12a arranged at the top of the case, and a baffle plate 46 arranged at this point to divide the space between the panel and coil into upflow and downflow passages for circulation of air in the refrigerating compartment 3b, so that the warmer air in said compartment 3b travels upward in contact with the inner surface of the pane 10a and portions of the conduits 13b, 13c are arranged in the downflow passage and subjected to the cooling action of the coil 12a, whereby such upper portions of the conduits form dehydrators to relieve the air of any excess moisture, the moisture discharging through the check valve drip outlets 17b. This type of construction is well adapted for low temperature showcases, as the employment of two air chambers 11a, 11b gives a desired insulating action between the outside air and the inside air to prevent frosting and the deposit of moisture on the panes, and one which may be installed and operated at an exceedingly low cost. This plan of construction may, of course, be further carried out for conditioning the air in the panel having more than three panes and an increased number of air conditioning chambers.

Fig. 8 shows the embodiment of a simple form of the invention similar to Fig. 7 in a show window in which a cooling coil 12b is disposed at the top of the window casing 1f and an air circulating conduit 13d extends around the back, top and bottom of the casing and communicates at the front with an air conditioning chamber 11c formed by outer and inner glass panes 9a and 10b, said conduit having a dehydrator portion 16b and a condensation drain outlet 17c. A door 8a gives access to the storage compartment 3f of the window. Gravity circulation of the air is here induced and dehydration effected by the action of the dehydrator 16b. A heater may be employed, as indicated at 18a, and controlled in action by thermostatic means, as in the constructions previously described.

Fig. 9 shows a construction similar to Fig. 8 except that the coil 12c is disposed at a side of the window casing 1g and the arrangement of the dehydrator portion 16c of the air circulating conduit 13e is accordingly varied.

In Fig. 10 I have shown a show window structure in which the cooling coil 12d is disposed at the back of the window structure 1h and the air conduit has a vertical portion 13f arranged parallel with the coil and forming a dehydrator and top and bottom branches 13g and 13h communicating with the air chamber 11 formed by glass panels 9b and 10c, at the front of the storage compartment 3g. At the juncture of branches 13g and 13h is a condensation outlet 17d, and connecting the inlet and discharge ends of branches 13g and 13h is a by-pass conduit branch 13i having at its bottom a condensation outlet 17e. At the junction of the inlet ends of branches 13g and 13i is a hand or automatically controlled valve or damper 47 operable for opening or closing communication between branch 13g and chamber 11 or between branch 13g and 13i. Under normal conditions, as when the outside temperature is above or not too far below that of chamber 11 and the outside air is humid to normal degree or above the circulation of the air is via conduit portions 13f, 13g, 13h and chamber 11, the air being cooled and dehydrated on its flow. When, however, the outside temperature falls appreciably below that of compartment 3g, the damper 47 is operated to cut off communication between conduit branch 13g and chamber 11 and to open communication between branch by-pass 13i and chamber 11, so that an air circuit will be established between the chamber and by-pass excluding the conduit portions 13f, 13g and 13h, for a gravity circulation in which the cold dry air in chamber 11 will be of a mean temperature between the external atmosphere and that of compartment 3f and will thus insulate the glass panes against frosting or the deposit of moisture thereon. The air in passing through conduit 13i is dehydrated sufficiently to prevent deposit of moisture on the surfaces of the panes exposed in chamber 11 for the reason that when conduit 13i is used the outside temperature is below the temperature in chamber 11.

From the foregoing description, taken in connection with the drawings, the construction and mode of operation of my novel and improved means for preventing frosting and the deposit of moisture on glass panels or windows will be readily understood and it will be seen that the invention provides a simple, reliable and efficient automatic means of this character which requires little or no attention and which may be manufactured and installed and maintained in working operation at a comparatively low cost. Also it will be seen that my invention provides a means for conditioning air, by heating, dehydrating it, or both, to place it in condition to provide a proper insulating medium or barrier between surfaces exposed to the same or different temperatures, whereby, according to conditions, frosting or the deposit of moisture on such surfaces will be effectually prevented. It is to be understood, of course, that the constructions shown are for purposes of exemplification only, and may be modified in many and various respects, within the scope of the appended claims, without departing from the spirit or sacrificing any of the advantages of the invention, and that the invention is not limited in its application to refrigerator counters or show windows, but may be employed for the purposes described wherever the use of an apparatus of this character is desirable or required.

Having thus fully described my invention, I claim:—

1. In an apparatus for conditioning the air in a hollow transparent-walled enclosure with respect to the condition of the air externally of the enclosure in order to prevent frosting or condensation of moisture obscuring vision through the enclosure, means for circulating air through a course including the enclosure, means for conditioning such air with respect to the external air, and automatic means responsive to variations between the external air and enclosed air for governing said conditioning means.

2. In an apparatus for conditioning the air in a hollow transparent-walled enclosure with respect to the condition of the air externally of the enclosure in order to prevent frosting or condensation of moisture obscuring vision through the enclosure, means for circulating air through a course including the enclosure, means for temperature conditioning such air with respect to the external air, and thermostatic means governed by variations between the external air and enclosed air for governing said conditioning means.

3. In an apparatus for conditioning the air in a hollow transparent-walled enclosure with respect to the condition of the air externally of the enclosure in order to prevent frosting or condensation of moisture obscuring vision through the enclosure, means for circulating air through a course including the enclosure, means for conditioning such air with respect to the external air, and automatic means governed by the degree of humidity of the external air for rendering said conditioning means operative or inoperative.

4. In an apparatus for conditioning the air in a hollow transparent-walled enclosure with respect to the condition of the air externally of the enclosure in order to prevent frosting or condensation of moisture obscuring vision through the enclosure, means for circulating air through a course including the enclosure, means in said course for dehydrating air, electrical means for heating the air, and thermal means controlled by variations of temperature of the air in the enclosure and externally thereof for letting on or cutting off the supply of current to the heating means.

5. In an apparatus for conditioning the air in a hollow transparent-walled enclosure with respect to the condition of the air externally of the enclosure in order to prevent frosting or condensation of moisture obscuring vision through the enclosure, means for circulating air through a course including the enclosure, means for conditioning such air in the enclosure with respect to air externally thereof, and automatic electrically controlled means governing said conditioning means.

6. In an apparatus for conditioning the air in a hollow transparent-walled enclosure with respect to the condition of the air externally of the enclosure in order to prevent frosting or condensation of moisture obscuring vision through the enclosure, means for heating the air in the enclosure, and automatic means governed by the temperature of the air in the enclosure and the air exteriorly thereof for governing said heating means.

7. In an apparatus for conditioning the air in a hollow transparent-walled enclosure with respect to the condition of the air externally of the enclosure in order to prevent frosting or condensation of moisture obscuring vision through the enclosure, an electric heater for heating the air in the enclosure, a hygrostat governing the supply of current to the heater, and a thermostatically controlled switch governing the supply of current to the heater.

8. In an apparatus for conditioning the air in a hollow transparent-walled enclosure with respect to the condition of the air externally of the enclosure in order to prevent frosting or condensation of moisture obscuring vision through the enclosure, means for circulating air through a course including the enclosure, an electric heater for heating the air in the enclosure, means for dehydrating the air, a hygrostat governing the supply of current to the electric heater, and thermally controlled means governing the supply of current to the electric heater.

9. In an apparatus for conditioning the air in a hollow transparent-walled enclosure with respect to the condition of the air externally of the enclosure in order to prevent frosting or condensation of moisture obscuring vision through the enclosure, an electric heater for heating the air in the enclosure, a hygrostat governed by the humidity of the air externally of the enclosure for controlling the supply of current to the heater, and means thermally responsive to temperature variations in the enclosure and externally thereof for controlling the supply of current to the heater.

10. In an apparatus for conditioning the air in a hollow transparent-walled enclosure with respect to the condition of the air externally of the enclosure in order to prevent frosting or condensation of moisture obscuring vision through the enclosure, means for circulating air through a course including the enclosure and dehydrating the air, an electric heater for heating the dehydrated air, a hygrostat governed by the humidity of the air externally of the enclosure for regulating the supply of current to the electric heater, and thermal means responsive both to variations in the temperature of the air in the enclosure and the air exteriorly thereof for controlling the supply of current to the electric heater.

11. In an apparatus for conditioning the air in a hollow transparent-walled enclosure with respect to the condition of the air externally of the enclosure in order to prevent frosting or condensation of moisture obscuring vision through the enclosure, a cooling compartment on one side of the enclosure having a cooling coil therein for cooling the same, an air circulating conduit including the enclosure having a portion exposed to the cooling action of the coil and forming a dehydrator, an electrical heating unit in the conduit, a hygrostat governed by the humidity of the external air for controlling the supply of current to the heating unit, and means thermally responsive to temperature variations in the enclosure and externally thereof for controlling the supply of current to the heating unit.

12. In an apparatus for conditioning the air in a hollow transparent-walled enclosure with respect to the condition of the air externally of the enclosure in order to prevent frosting or condensation of moisture obscuring vision through the enclosure, a cooling compartment at one side of said enclosure, an electrical heater for heating the air in the enclosure, a switch for controlling the supply of electric current to the heater, and thermally responsive devices disposed respectively within said enclosure and on the opposite side of the enclosure from said compartment for controlling the action of said switch.

13. In an apparatus for conditioning the air in a hollow transparent-walled enclosure with respect to the condition of the air externally of the enclosure in order to prevent frosting or condensation of moisture obscuring vision through the enclosure, a cooling compartment on one side of the enclosure, an electrical heater for heating the air in the enclosure, a switch for controlling the supply of electric current to the heater, and opposed counteracting thermally responsive devices exposed to the temperature of the air in the enclosure and on the side of the enclosure opposite said cooling compartment and exerting pressures in opposition to each other for opening and closing said switch device.

14. In an apparatus for conditioning the air in a hollow transparent-walled enclosure with respect to the condition of the air externally of the enclosure in order to prevent frosting or condensation of moisture obscuring vision through the enclosure, means for circulating air through a course including the enclosure, means for conditioning such air with respect to the external air, automatic means responsive to variations between the external air and enclosed air for governing said conditioning means, and a check valved drain outlet for draining condensate from the enclosure.

15. In an apparatus for conditioning air in a hollow transparent-walled enclosure exposed on one side to the temperature of an artificially cooled compartment having a refrigerating element therein and on its other side to the temperature of the external atmosphere, a panel chamber, a conduit connected with the top and bottom of the chamber in the hollow wall of the enclosure and having a portion exposed to the temperature of the refrigerating element in the refrigerating compartment, and a second conduit communicating with the top and bottom of said panel chamber and having a portion exposed to the temperature of the outside air, and means governing the flow of air through the latter-named conduit.

16. In an apparatus for conditioning the air in a transparent-double-walled enclosure with respect to the condition of the air on both sides of the enclosure in order to prevent frosting or condensation of moisture on either wall of the enclosure obscuring vision through the enclosure, a conduit for circulating air through a course including the enclosure, a refrigerating device on one side of the enclosure, a portion of the conduit being exposed to the refrigerating device and forming a dehydrator, means for conditioning the circulating air with respect to the air at the opposite side of the enclosure, automatic means responsive to variations between the air on the latter-named side of the enclosure and the enclosed air for governing said conditioning means, and means for draining condensate resulting from the action of the dehydrator from the conduit.

DAVID R. LAUDERBACK.